United States Patent [19]

Schuurink et al.

[11] 4,265,973

[45] May 5, 1981

[54] METHOD FOR COATING AN OBJECT MADE OF A VULCANIZED POLYALKYLENE RUBBER

[75] Inventors: Pieter H. J. Schuurink, RG Noordwijk-Binnen; Arie Noomen, ED Voorhout, both of Netherlands

[73] Assignee: Akzo NV, Arnhem, Netherlands

[21] Appl. No.: 911,837

[22] Filed: Jun. 2, 1978

[30] Foreign Application Priority Data

Jun. 8, 1977 [NL] Netherlands ............... 7706283

[51] Int. Cl.$^3$ .............................................. B32B 27/40
[52] U.S. Cl. ............................. 428/424.8; 156/331.7; 427/393.5; 525/456; 525/457
[58] Field of Search ................ 528/75; 525/456, 457, 525/453; 427/393.5; 156/331; 428/423.1, 424.8

[56] References Cited

U.S. PATENT DOCUMENTS

| | | | |
|---|---|---|---|
| 4,072,770 | 2/1978 | Ting | 427/54.1 |
| 4,136,219 | 1/1979 | Odam et al. | 428/423.9 X |
| 4,205,102 | 5/1980 | Schuurik et al. | 427/393.5 |

FOREIGN PATENT DOCUMENTS 7506793 12/1976 Netherlands .

*Primary Examiner*—Ronald H. Smith
*Assistant Examiner*—Thurman K. Page
*Attorney, Agent, or Firm*—Stevens, Davis, Miller & Mosher

[57] ABSTRACT

A method is provided for coating a vulcanized polyalkylene rubber with a composition which contains an ethylenically unsaturated polyurethane binder containing active hydrogen atoms with a cross-linking agent for the polyurethane and a free radical initiator.

The polyurethane binder is prepared by reacting an organic polyhydroxy compound, an acrylic or methacrylic hydroxy ester and an organic diisocyanate and reacting the resulting reaction product with a polyamine or alkanol amine.

12 Claims, No Drawings

METHOD FOR COATING AN OBJECT MADE OF A VULCANIZED POLYALKYLENE RUBBER

This invention relates to a method for coating a vulcanized alkylene rubber object with a composition containing a polyurethane.

A method of the type indicated above is disclosed in the Netherlands Patent Application No. 7 506 793. With said method, however, it is necessary to pretreat the surface of the object to be coated, for instance with the aid of an oxidizing agent or the use of UV-radiation. This pretreatment is required to obtain the desired adhesion of the coating to rubber with the binder described. Such a pretreatment has the disadvantage, however, that it calls for the use of a special apparatus the operation of which, in its turn, requires special attention, which increases the cost of the method.

An object of the present invention is to provide a method which does not require pretreatment of the vulcanized object.

Another object of the invention is to provide a process using a specific composition based on a polyurethane as the binder. To apply this composition to an object, generally available simple, conventional equipment may be used.

The method provided by the invention is characterized in that use is made of a composition prepared by admixing in a ratio of 100 parts by weight of an ethylenically unsaturated polyurethane binder with active hydrogen atoms, 0.25-30 parts by weight of a cross-linking agent for the polyurethane binder and 0.1-10 parts by weight of a radical initiator, the polyurethane binder being prepared by reaction of (a) 0.5-0.99 equivalents of a polyhydroxy compound, (b) 0.01-0.5 equivalents of an acrylic or methacrylic hydroxy ester and (c) 1.6-2.4 equivalents of an organic diisocyanate, after which the resulting reaction product is reacted with 1.1-2.8 equivalents of a polyamine or alkanol amine.

By a polyalkylene rubber is to be understood here a saturated or unsaturated rubber made up of ethylene, one or more α-alkenes having 3 to 8 carbon atoms, for instance propylene and 1-butylene, and possibly one or more ethylenically polyunsaturated compounds having non-conjugated double bonds, for instance 1,4-hexadiene, dicyclopentadiene, 5-methylene-2-norbornene, 5-ethylidene-2-norbornene, 4-isopropylidene-2-norbornene and the like. In the preparation of these rubbers, metal organic catalyst systems known as Ziegler-Natta catalysts are usually used in solution or dispersion at temperatures in the range of −30° to +100° C., such as described in the U.S. Pat. Nos. 3,629,212 and 3,645,993. Polyalkylene rubbers made up of 30-90% by weight of ethylene, 10-70% by weight of one or more α-alkenes having 3-8 carbon atoms, for instance propylene and/or 1-butylene, and possibly 0.3-15% by weight of one or more compounds having non-conjugated ethylenically unsaturated C—C bonds are preferred.

Optionally, the polyalkylene rubber may be mixed with one or more other rubbers, with oligomers or polymers of α-alkenes, for instance ethylene and propylene, and with the usual additives, such as oil, carbon black and/or other filters, zinc oxide and stearic acid. During or after their being shaped, which may be done in the usual manner, the rubber objects may partially or entirely be vulcanized by a suitable method before they are provided with a coating by the process according to the invention.

Vulcanization is effected in the usual way, and generally by means of a radical initiator and/or sulphur and/or one or more vulcanization accelerators at a temperature in the range of 10° to 200° C. The vulcanization methods are known to a man skilled in the art and need not be further described here.

According to the invention the polyurethane binder is prepared by reacting (a) 0.5-0.99 equivalent of a polyhydroxy compound, (b) 0.01-0.5 equivalent of an acrylic or methacrylic hydroxy ester and (c) 1.6-2.4 equivalents of a diisocyanate, after which the resulting reaction product is brought into reaction with 1.1-2.8 equivalents of a polyamine or alkanolamine.

Suitable polyhydroxy compounds are, inter alia, the polyols used in the preparation of paints and glues, such as polyester polyols and polyether polyols and hydroxy acrylate polymers, for instance: polytetrahydrofuran diol, polycaprolactone diol, polycaprolactone polyol, polybutane ether diol and polypentane ether diol. The molecular weight of the polyhydroxy compounds is generally in the range of 500 to 3000, and preferably in the range of 800 to 2200. Substantially linear diols, more particularly linear diols with terminal hydroxy groups are preferred.

The acrylic or methacrylic hydroxy ester contains 1 or 2 hydroxy groups and 1, 2 or 3 acrylate or methacrylate groups. As examples of suitable compounds may be mentioned trimethylol propane monoacrylate, trimethylol propane diacrylate, pentaerythritol diacrylate, 2-hydroxy ethyl acrylate, 2-hydroxy ethyl methacrylate, 3-hydroxy propyl acrylate, 3-hydroxy propyl methacrylate, 2-hydroxy-3-chloropropyl acrylate, 6-hydroxyl hexyl acrylate, 8-hydroxy octyl acrylate, 12-hydroxy dodecanyl acrylate and dihydroxy propyl acrylate. 2-hydroxy ethyl acrylate and pentaerythritol triacrylate are preferred. It is also possible to use mixtures of two or more hydroxy esters.

As organic diisocyanates, generally aliphatic, cycloaliphatic and aromatic compounds having 3-30 carbon atoms are chosen. Suitable compounds are, for instance, methylene diisocyanate, tetramethylene diisocyanate, hexamethylene diisocyanate, trimethylhexamethylene diisocyanate, dicyclohexylmethane diisocyanate, diphenylmethane diisocyanate, isophorone diisocyanate, toluene diisocyanate and xylenyl diisocyanate. Also mixtures of two or more diisocyanates may be used.

An organic triisocyanate or an organic polyisocyanate may be used in a small amount of, for instance, not more than 15% by weight, based on the amount of diisocyanate, to modify the physical properties of the coating layer. The adduct of 3 molecules of hexamethylene-1,6-diisocyanate and 1 molecule of water (marketed by Farbenfabriken Bayer of Leverkusen, West Germany under the trade name Desmodur N) and the adduct of 3 molecules of toluene diisocyanate and 1 molecule of trimethylol propane (marketed by Bayer under the trade name Desmodur L) are also examples of suitable isocyanates.

The polyhydroxy compound(s), the hydroxy ester(s) and the diisocyanate compound(s) may be reacted with each other in any convenient manner. Thus the isocyanate compound may be mixed with a mixture of the polyhydroxy compound and the hydroxy ester. It is also possible for the isocyanate compound first to be reacted with the polyol compound and subsequently to bring the hydroxy ester into reaction with the reaction product containing isocyanate groups. Another possibility involves use of a combination of reaction methods. The reaction is preferably carried out by adding the hydroxy compound(s) to the isocyanate compound(s), but may also be carried out in a different way. The reaction is as a rule carried out in the presence of an inert solvent, for instance a ketone such as acetone and methylisobutyl ketone; a hydrocarbon such as toluene and xylene; and an ester such as ethyl acetate, butyl acetate, and ethylglycol acetate. The reaction between the binder components generally takes place at a temperature between 10° and 150° C., more particularly between 20° and 80° C. Optionally, use may be made of catalysts, such as tertiary amines, for instance diazabicyclooctane, triethylamine and N-methyl morpholine, tin compounds, for instance dibutyl tindilaurate and stannous octoate, lead compounds, for instance lead octoate, and zinc compounds, for instance zinc octoate.

The resulting reaction product containing isocyanate groups is subsequently reacted according to the invention with 1.1–2.8 equivalents of a polyamine or alkanolamine for the purpose of increasing the length of the molecules of the reaction product. By a polyamine is to be understood here a compound containing 2 or more amino groups and preferably having 2-20 carbon atoms. As suitable polyamines may be mentioned ethylene diamine, hexamethylene diamine, diethylene triamine, isophorone diamine, and octadecylene diamine. It is preferred that use should be made of a diamine and more particularly a diamine having 2–12 carbon atoms. The alkanolamine should contain at least 1 primary or secondary amino group and not more than 10 carbon atoms. As examples of suitable alkanolamines may be mentioned monoethanolamine, diethanolamine, and 1,5-diamino-3-pentanol.

According to the invention, 100 parts by weight of the polyurethane binder prepared in the above-described way may be mixed with 0.25–30, and preferably 2–20 parts by weight of a cross-linking agent for the polyurethane binder.

A suitable cross-linking agent is, for instance, an organic polyisocyanate by which is to be understood here a compound having 2 or more isocyanate groups per molecule of the polyisocyanate. As examples of suitable polyisocyanates may be mentioned the adduct of 3 molecules of hexamethylene-1,6-diisocyanate and 1 molecule of water (available under the trade name Desmodur N), the adduct of 1 molecule of trimethylol propane and 3 molecules of toluene diisocyanate (available under the trade name Desmodur L), isophorone diisocyanate, the adduct of 1 molecule of trimethylol propane and 3 molecules of isophorone diisocyanate, toluene diisocyanate, xylenyl diisocyanate, dicyclohexylmethane-4,4'-diisocyanate, diphenylmethane diisocyanate, trimethylhexamethylene diisocyanate or prepolymers prepared by reaction of a polyisocyanate with a polyol such as trimethylol propane. It is also possible to use mixtures of two or more polyisocyanates. The polyisocyanate may be blocked, if desired, by suitable blocking agents, for instance with a phenol, a cresol, an oxime, such as methylethyl ketoxime, an acetylacetic ester or with a lactam, such as caprolactam. Particularly favorable results are obtained when an ester of hydroxamic acid or an acyl hydroxamate is used as described in the Netherlands Patent Application No. 7 415 726, in which case a relatively low de-blocking temperature is obtained. It is preferred that as blocking agent an allylmethacryloyl hydroxamate should be used. The cross-linking agent also may be an aminoplast resin, for instance a urea formaldehyde resin, a melamine formaldehyde resin, a benzoguanamide resin, a sulphonamide resin or an N-methylol-and/or N-methylol ether groups-containing aminoplast resin, as obtained by reacting an aldehyde, for instance formaldehyde, with an amino groups- or amido groups-containing compound such as melamine or urea. A suitable aminoplast resin is for instance a methylol melamine having 4 to 6 methylol groups per melamine molecule, at least 3 methylol groups being etherified with methanol, ethanol, propanol or butanol. As an example of a particularly suitable methylol melamine may be mentioned a hexaalkoxymethyl melamine in which the alkoxy group contains 1 to 4 carbon atoms.

As third component of the composition according to the invention 0.1 to 10 parts by weight of a radical initiating compound per 100 parts by weight of the polyurethane binder are used. As examples of suitable radical initiators may be mentioned peroxides, azo compounds, such as azobisisobutyronitrile, or bromo-substituted methylolphenol resins. Suitable peroxides are for instance: methylethyl ketone peroxide, cumene hydroperoxide and p.tert.butyl perbenzoate. It is preferred that use should be made of compounds having a critical temperature in the range of 50°–130° C. Methylolphenol resins are known compounds and are described in, for example, U.S. Pat. No. 2,972,600.

The composition according to the invention may contain the usual additives and adjuvants, for instance pigments, delustring agents and leveling agents, such as silicone oils. The above-envisaged additives and adjuvants may be added to the composition in any stage of the preparation thereof. For instance they may be added to one or more of the separate components, or in some other way, for instance by mixing with a solvent which is subsequently mixed with one or more of the components.

The composition provided by the invention may be applied to the vulcanized rubber object by any conventional way, for instance by a brushing, sprinkling, spraying or dipping method.

After the composition has been applied to the rubber object spot-wise or in a continuous layer, the coating obtained is dried in the usual manner. When the objects have been dried at a temperature in the range of, say, 0° to 160° C., for, say, 2 minutes up to 24 hours, they can be handled and stored without any chance of damage to the applied coating.

The composition according to the invention may be applied to the rubber object as primer, but also may be used as glue for rubber-to-rubber bonds or for laminates.

The invention is illustrated but not limited by the following examples in which the percentage elongation at break of a self-supporting layer of the cured composition was measured at a tensile rate of 10 mm per minute. The adhesion of the topcoat was measured by carrying out a cross-hatch test in accordance with DIN-standard method 53 151 and is expressed in mm; the lower this value, the stronger will be the bond obtained. The influence of condensate on the top layer was measured over a period of 1 month in accordance with ASTM blistering test D 714-56. In all the Examples I–V, the adhesion of the primer to the substrate was found to be excellent.

EXAMPLE I

In a reactor provided with a stirrer and a condenser 156 grams of a 50% by weight-solution of isophorone diisocyanate in xylene and 0.25 grams of dibutyl din dilaurate was heated to 60° C. under a nitrogen atmosphere.

Subsequently, a mixture of 159 grams of a polycaprolactone diol having a molecular weight of 1000 and 9 grams of pentaerythritol triacrylate, were slowly added, with stirring. The reaction was terminated after 2 hours stirring at 60° C. To the resulting reaction product there were added, with stirring, a mixture of 23.3 grams of isophorone diisocyanate and 3 grams of monoethanol amine as a 10% by weight solution in a mixture of equal parts by weight of isopropyl alcohol and diisobutyl ketone. The total amount of solvent was so chosen that the final mixture contained 30% by weight of the polyurethane binder according to the invention.

Next, 100 parts by weight of the solution of the binder were mixed with 20 parts by weight of titanium dioxide and the mixture was ground to a particle size of 10 μm. The mixture was then mixed with 5 parts by weight of a methylated urea formaldehyde resin (marketed by American Cyanamid under the trade name UFR 1060-25), 1 part by weight of 5% by weight-solution of p-toluene sulphonic acid in xylene and 3 parts by weight of cumene hydroperoxide. The mixture thus prepared was diluted to a viscosity of 14 seconds (DIN cup 4 at 20° C.) with the aid of a mixture of equal parts by weight of xylene andisopropyl alcohol and subsequently, with the aid of a spray gun, applied to an object made of a vulcanized rubber consisting of ethylene, propylene and ethylidene norbornene (marketed by Dutch State Mines under the trade name Keltan 712). The rubber had previously been degreased with xylene. In the dried state the applied coating composition had a thickness of 15 μm.

The coated object was baked for twenty minutes at a temperature of 130° C., after which it was cooled and provided with a topcoat based on polyurethane. The polyurethane binder had been prepared from 70 parts by weight of a polycaprolactone diol and 30 parts by weight of a hydroxy acrylate copolymer and cured with the adduct of 3 molecules of hexamethylene-1,6-diisocyanate and 1 molecule of water (marketed by Bayer under the trade name Desmodur N). In its dry state the thickness of the topcoat was 35 μm. After the topcoat had been applied, it was first kept at room temperature for 10 minutes and subsequently at 100° C. for 30 minutes for curing purposes. Subsequently, the percentage elongation at break of the self-supporting film and the adhesion were measured, and the object was tested for the formation of blisters. The results are listed in Table I.

EXAMPLE II

The procedure of Example I was repeated but in such a way that the solution of the polyurethane binder pigmented with titanium dioxide was mixed with 4 parts by weight of an adduct of 3 molecules of hexamethylene-1,6-diisocyanate and 1 molecule of water blocked with an allylacryloyl hydroxamate and 2 parts by weight of azobisisobutyronitrile. The measuring results obtained are listed in Table I.

EXAMPLE III

The same procedure was used in Example I, with the exception that instead of 2 parts by weight of azobisisobutyronitrile 5 parts by weight of bromo-substituted methylol phenol resin were used. The measuring results obtained are given in Table I.

EXAMPLE IV

The same procedure was used as in Example II, with the exception that in the preparation of the polyurethane binder instead of the polycaprolactone diol a polytetrahydrofuran diol having a molecular weight of 1000 was used. The final results as regards adhesion, percentage elongation and the blistering test are given in Table I.

Example V

The procedure of Example II was repeated in such a way that in the preparation of the polyurethane binder a polycaprolactone diol having a molecular weight of 2000 was used. The measuring results obtained are given in Table I.

COMPARATIVE EXAMPLE A

For comparison the procedure of Example I was repeated, but in such a way that no use was made of pentaerythritol triacrylate. The measuring results obtained are given in Table I.

COMPARATIVE EXAMPLE B

For comparison the procedure of Example I was repeated, in such a way that no use was made of monoethanolamine and that isophoron diisocyanate was employed in an amount of 27.7 grams instead of 23.3 grams. The physical properties of the product are given in Table I.

TABLE I

| Example | % Elongation at break of self-supporting layer | Adhesion | Blistering test |
| --- | --- | --- | --- |
| I | 170 | 0.1 mm | good |
| II | 195 | 0.1 mm | good |
| III | 200 | 0.1 mm | good |
| IV | 300 | 0.1 mm | good |
| V | 300 | 0.1 mm | good |
| Comparison A | 170 | very poor; not measurable | blisters/ loss of adhesion |
| Comparison B | 170 | 0.6 mm | blisters/ loss of adhesion |

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A method for coating an object made of a vulcanized polyalkylene rubber with a composition containing a polyurethane characterized in that a composition which is prepared by admixing 100 parts by weight of an ethylenically unsaturated polyurethane binder with active hydrogen atoms, 0.25-30 parts by weight of a cross-linking agent for the polyurethane binder and 0.1-10 parts by weight of a radical initiating compound is applied to the object, said polyurethane binder being prepared by reaction of (a) 0.5-0.99 equivalent of a polyhydroxy compound, (b) 0.01-0.5 equivalent of an acrylic or methacrylic hydroxy ester and (c) 1.6-2.4 equivalents of an organic diisocyanate, after which the resulting reaction product is reacted with 1.1-2.8 equivalents of a polyamine or alkanolamine.

2. The method of claim 1, characterized in that the composition contains 2–20 parts by weight of the said cross-linking agent.

3. The method of claim 1, characterized in that the said polyhydroxy compound is a linear diol.

4. The method of claim 3, characterized in that the polyhydroxy compound is a linear diol with terminal hydroxyl groups.

5. The method of claims 1, 2, 3, 4, or 9, characterized in that the said acrylic or methacrylic hydroxy ester is 2-hydroxylethyl acrylate or pentaerythritol triacrylate.

6. The method of claims 1, 2, or 4, characterized in that the polyamine is a diamine.

7. The method of claim 6, characterized in that the diamine contains 2–12 carbon atoms.

8. A coated object obtained by the method of claims 1, 2, 3, 4, or 7.

9. A method for coating a polyalkylene ether rubber with a polyurethane which comprises applying to the rubber a mixture containing in a ratio of 100 parts by weight of an ethylenically unsaturated polyurethane binder having active hydrogen atoms, 0.25 to 30 parts by weight of a cross-linking agent for the polyurethane binder and 0.1 to 10 parts by weight of a radical initiator, said binder having been prepared by reaction of 0.5 to 0.99 equivalents of a polyhydroxy compound, 0.01 to 0.5 equivalents of an acrylic or methacrylic hydroxy ester and 1.6 to 2.4 equivalents of an organic diisocyanate, said binder having terminal isocyanato groups, and thereafter reacting the said binder with from 1.1 to 2.8 equivalents of a polyamine or an alkanolamine.

10. The method of claim 1 wherein the said polyhydroxy compound is a linear diol.

11. The method of claim 10 wherein the polyamine is a diamine.

12. A coated object obtained by the method of claim 10 or 11.

* * * * *